US012706417B2

(12) United States Patent
Lin et al.

(10) Patent No.: US 12,706,417 B2
(45) Date of Patent: Aug. 11, 2026

(54) ELECTRICAL CONNECTOR ASSEMBLY

(71) Applicant: WISTRON CORPORATION, New Taipei City (TW)

(72) Inventors: Pojan Lin, New Taipei City (TW); Shu-Chen Lin, New Taipei City (TW)

(73) Assignee: WISTRON CORPORATION, New Taipei City (TW)

(*) Notice: Subject to any disclaimer, the term of this patent is extended or adjusted under 35 U.S.C. 154(b) by 211 days.

(21) Appl. No.: 18/234,511

(22) Filed: Aug. 16, 2023

(65) Prior Publication Data

US 2024/0222906 A1 Jul. 4, 2024

Related U.S. Application Data

(60) Provisional application No. 63/470,271, filed on Jun. 1, 2023.

(30) Foreign Application Priority Data

Jan. 4, 2023 (TW) ................................ 112100192

(51) Int. Cl.
*H01R 13/629* (2006.01)
*H01R 12/72* (2011.01)

(52) U.S. Cl.
CPC ......... *H01R 13/629* (2013.01); *H01R 12/722* (2013.01)

(58) Field of Classification Search
CPC ......................... H01R 13/629; H01R 13/6315; H01R 12/722; H01R 12/91
USPC ......................................... 439/160, 247, 248
See application file for complete search history.

(56) References Cited

U.S. PATENT DOCUMENTS

| | | | | | |
|---|---|---|---|---|---|
| 2,954,543 | A * | 9/1960 | Rayer | H01R 13/629 | 439/248 |
| 5,795,166 | A * | 8/1998 | Meixler | H01R 13/60 | 439/149 |
| 6,592,387 | B2 * | 7/2003 | Komenda | H01R 13/6315 | 439/247 |
| 7,090,521 | B2 * | 8/2006 | Nishio | H01R 13/6315 | 439/248 |
| 7,294,010 | B1 * | 11/2007 | Shaikh | H01R 13/629 | 439/247 |
| 7,922,510 | B2 * | 4/2011 | Klinger | H01R 13/6315 | 439/247 |

(Continued)

FOREIGN PATENT DOCUMENTS

| | | |
|---|---|---|
| CN | 208889994 U | 5/2019 |
| CN | 215991467 U | 3/2022 |

(Continued)

*Primary Examiner* — Gary F Paumen
(74) *Attorney, Agent, or Firm* — Brooks Kushman P.C.

(57) ABSTRACT

An electrical connector assembly including a push-pull mechanism, a base, a first electrical connector and a second electrical connector is provided. The base is detachably connected to the push-pull mechanism. The first electrical connector is connected to the base and is configured to slide relatively to the base in a floating direction. The second electrical connector is disposed correspondingly to the first electrical connector. The base is pushed and slid toward the second electrical connector in a sliding direction via the push-pull mechanism pushes, and the first electrical connector is slide synchronously with the base to be plugged into the second electrical connector.

20 Claims, 17 Drawing Sheets

(56) References Cited

U.S. PATENT DOCUMENTS

| | | | | |
|---|---|---|---|---|
| 8,894,431 | B2 * | 11/2014 | Tiberghien | H01R 13/6315 439/247 |
| 8,951,055 | B2 * | 2/2015 | Eusterholz | H01R 13/6315 439/378 |
| 10,483,687 | B2 | 11/2019 | Yamashita et al. | |
| 10,861,771 | B2 | 12/2020 | Wu et al. | |
| 11,419,207 | B2 * | 8/2022 | Chen | H04N 23/55 |
| 11,431,830 | B2 * | 8/2022 | Park | H05K 1/02 |
| 2009/0068870 | A1 * | 3/2009 | Mezhinsky | H01R 13/6315 439/247 |
| 2010/0055951 | A1 * | 3/2010 | Matsuzawa | H01R 13/6315 439/248 |
| 2015/0044887 | A1 * | 2/2015 | Tateishi | H01R 12/7017 439/65 |
| 2015/0289405 | A1 | 10/2015 | Stewart et al. | |
| 2015/0333446 | A1 * | 11/2015 | Yuan | H01R 13/665 439/248 |
| 2021/0044681 | A1 * | 2/2021 | Park | H05K 3/222 |
| 2022/0140529 | A1 * | 5/2022 | Zhang | H01R 13/631 439/248 |
| 2022/0248543 | A1 | 8/2022 | Bangera et al. | |
| 2022/0359999 | A1 * | 11/2022 | Steer | H05K 1/117 |

FOREIGN PATENT DOCUMENTS

| | | | |
|---|---|---|---|
| CN | 216648747 | U | 5/2022 |
| CN | 218180988 | U | 12/2022 |
| TW | 201607172 | A | 2/2016 |
| TW | 202111471 | A | 3/2021 |
| TW | I785743 | B | 12/2022 |

* cited by examiner

ELECTRICAL CONNECTOR ASSEMBLY

CROSS-REFERENCE TO RELATED APPLICATIONS

This application claims the benefit of U.S. provisional patent application Ser. No. 63/470,271, filed on Jun. 1, 2023, and claims priority to Taiwan patent application serial no. 112100192, filed on Jan. 4, 2023, now Taiwan Patent No. TW I840069 B issued on Apr. 21, 2024. The entirety of the above-mentioned patent applications are hereby incorporated by reference herein and made a part of this specification.

BACKGROUND

Technical Field

The present disclosure relates to a connector, and in particular to an electrical connector assembly.

Description of Related Art

In a common server, the two docked electrical connectors (hereinafter referred to as first electrical connector and second electrical connector) are easily damaged due to improper application of force during assembly and disassembly. In order to facilitate the assembly and disassembly of the first electrical connector and the second electrical connector, and to avoid damage to the first electrical connector and the second electrical connector, a labor-saving structure, such as a labor-saving handle, is mostly used to push and pull the first electrical connector to plug the first electrical connector in and out of the second electrical connector.

Due to process tolerances and assembly tolerances, during the process of plugging the first electrical connector into the second electrical connector, the terminals of the first electrical connector and the terminals of the second electrical connector may be in poor electrical contact resulting from insufficient wipe length or contact area bad situation; or, the first electrical connector and the second electrical connector are damaged due to excessive pressure applied to the first electrical connector and the second electrical connector causing by the excessive pushing path of the first electrical connector; or else, the first electrical connector and the second electrical connector may not be docked due to misalignment, resulting in poor assembly reliability and assembly efficiency.

SUMMARY

The disclosure provides an electrical connector assembly, which helps to improve assembling reliability and assembling efficiency.

In an embodiment of the disclosure, an electrical connector assembly including a push-pull mechanism, a base, a first electrical connector and a second electrical connector is provided. The base is detachably connected to the push-pull mechanism. The first electrical connector is connected to the base and is configured to slide relatively to the base in a floating direction. The second electrical connector is disposed correspondingly to the first electrical connector. The push-pull mechanism pushes the base to slide toward the second electrical connector in the sliding direction, and the first electrical connector slides synchronously with the base, so that the first electrical connector is plugged into the second electrical connector.

In an embodiment of the disclosure, an electrical connector assembly including a housing, a push-pull mechanism, a base, a first electrical connector and a second electrical connector is provided. The push-pull mechanism is disposed on the housing. The base is detachably connected to the push-pull mechanism. The first electrical connector is connected to the base and is configured to slide relatively to the base in the floating direction. The second electrical connector is disposed correspondingly to the first electrical connector on the housing. The push-pull mechanism pushes the base to slide toward the second electrical connector in the sliding direction, and the first electrical connector slides synchronously with the base, so that the first electrical connector is plugged into the second electrical connector.

Based on the above, in the electrical connector assembly of the present disclosure, the technician can push the first electrical connector to slide toward the second electrical connector through the push-pull mechanism, so that the first electrical connector can be accurately and quickly plugged into the second electrical connector, so that the electrical connector assembly has excellent assembling efficiency. In one embodiment, the electrical connector assembly has a buffer design, for example, a buffer effect is generated during the process of plugging the first electrical connector into the second electrical connector, so as to prevent the first electrical connector and the second electrical connector from being damaged due to excessive pressure, thereby improving assembly reliability. In another embodiment, the electrical connector assembly has a floating alignment design. For example, the first electrical connector can generate moderate floating during the process of docking with the second electrical connector, so as to be accurately aligned with the second electrical connector, prevent the first electrical connector and the second electrical connector being damaged during docking due to misalignment and collision, thereby improving assembling reliability and assembling efficiency.

In order to make the above-mentioned features and advantages of the present disclosure more comprehensible, the following specific embodiments are described in detail together with the accompanying drawings.

DESCRIPTION OF THE EMBODIMENTS

Figure 1A:
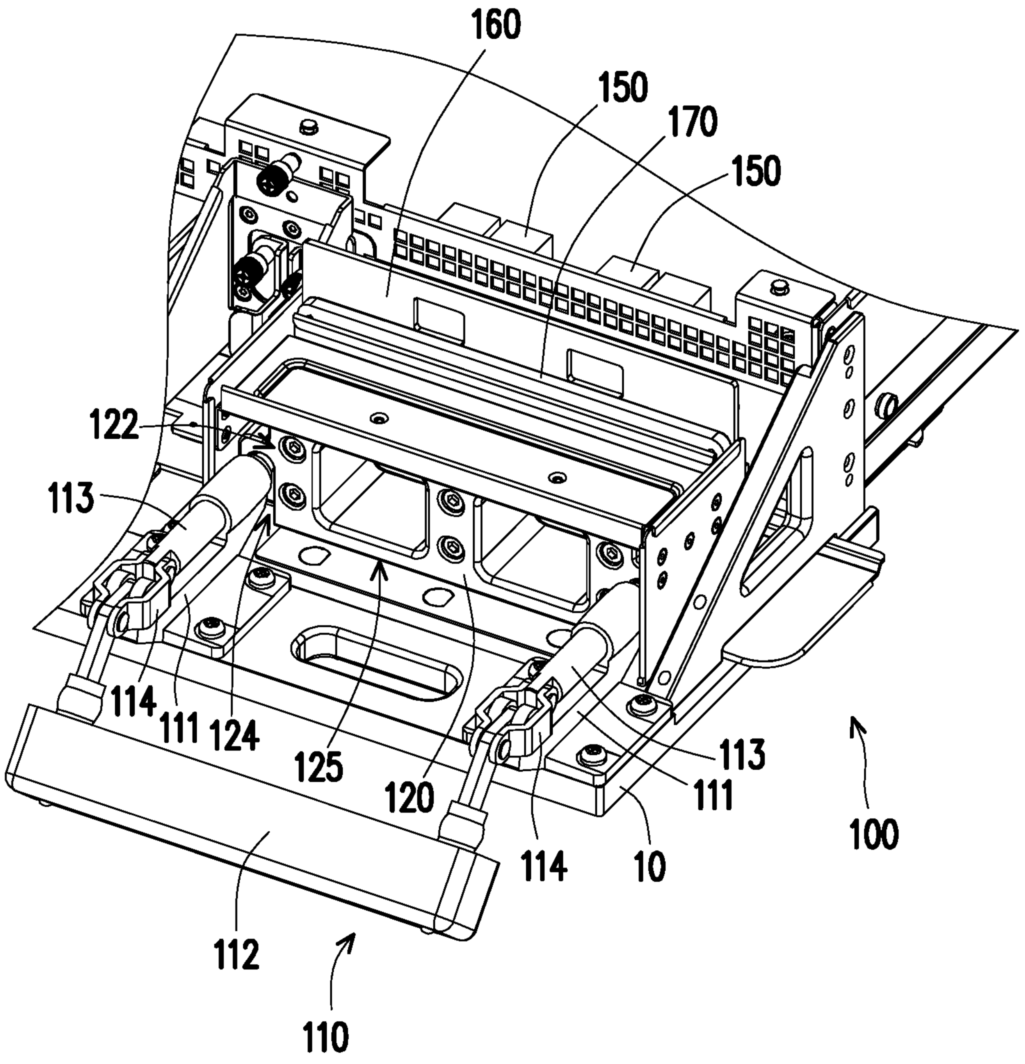
FIG. 1A is a schematic diagram of an electrical connector assembly of the first embodiment of the present disclosure.
Figure 1B:
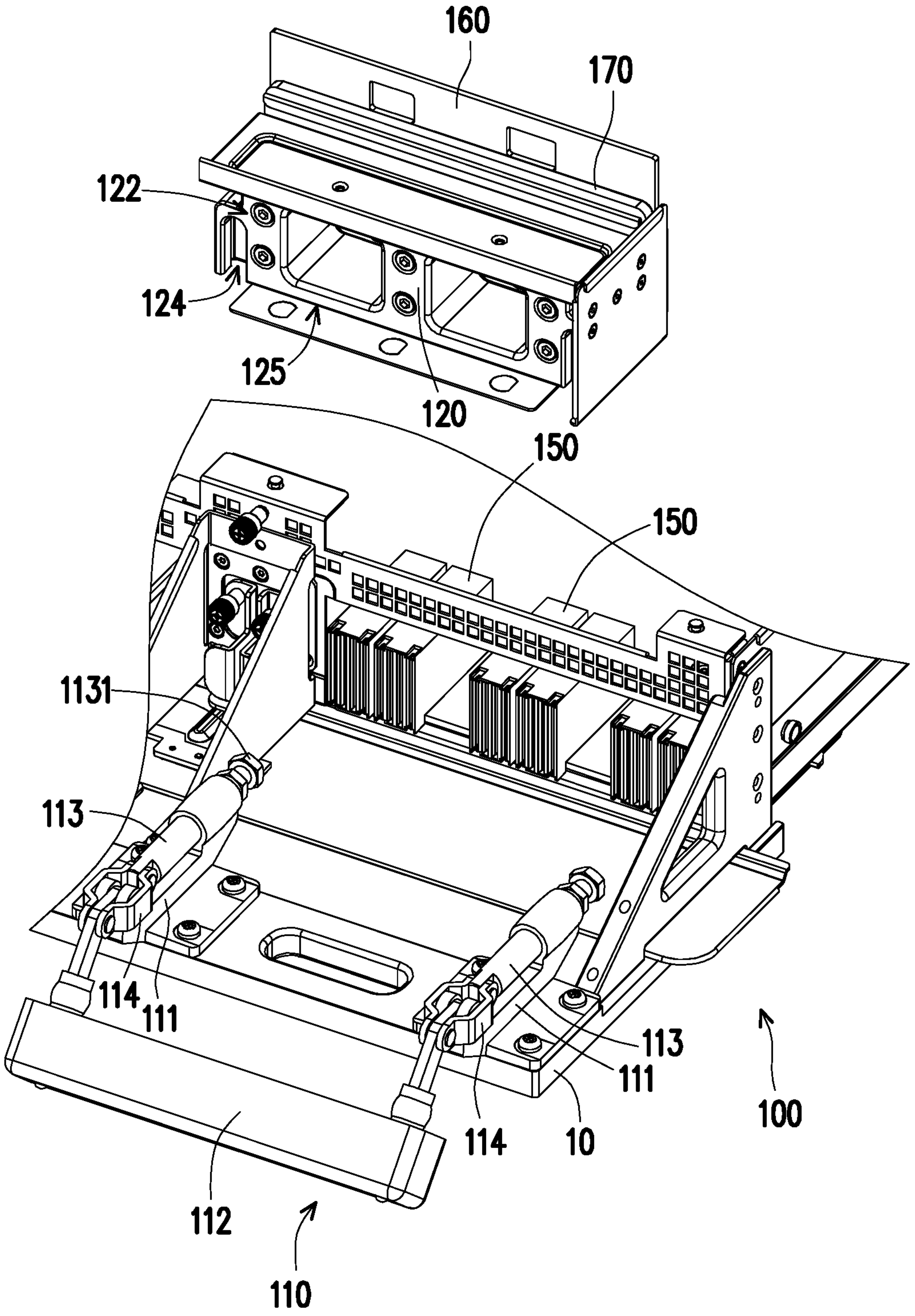
FIG. 1B is an exploded view of the electrical connector assembly of FIG. 1A.
Figure 1C:
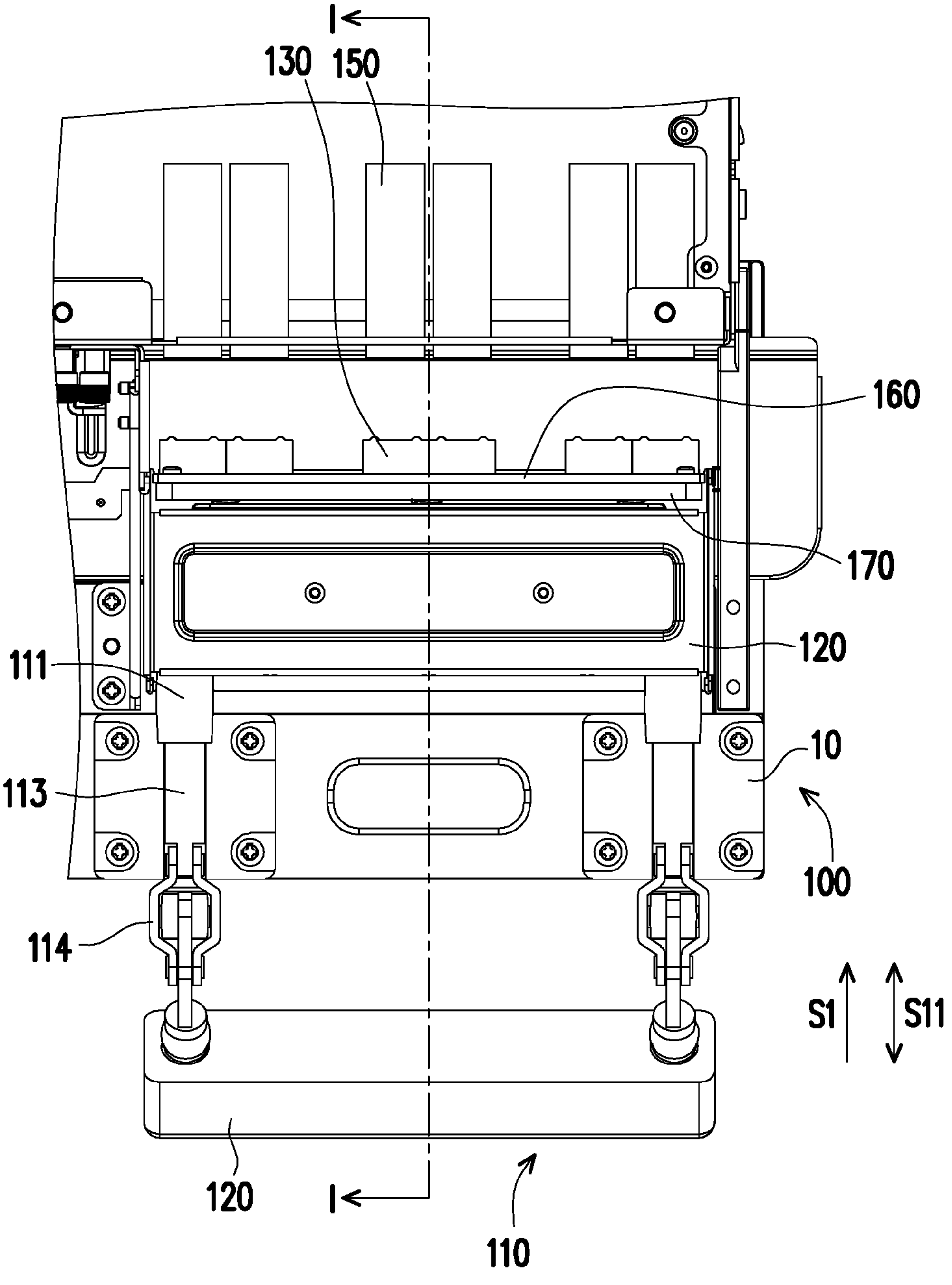
FIG. 1C is a schematic top view of the electrical connector assembly in FIG. 1A.

FIG. 1A is a schematic diagram of an electrical connector assembly of the first embodiment of the present disclosure. FIG. 1B is an exploded view of the electrical connector assembly of FIG. 1A. FIG. 1C is a schematic top view of the electrical connector assembly in FIG. 1A. Referring to FIG. 1A to FIG. 1C, in this embodiment, an electrical connector assembly 100 can be applied to servers or other electronic devices, and includes a housing 10, a push-pull mechanism 110, a base 120, a first electrical connector 130 and a second electrical connector 150. The push-pull mechanism 110 and the second electrical connector 150 are disposed on the housing 10, and the first electrical connector 130 is disposed on one side of the base 120.

As shown in FIG. 1A and FIG. 1C, the second electrical connector 150 disposed correspondingly to the first electrical connector 130, wherein the first electrical connector 130 is located between the base 120 and the second electrical connector 150, and the base 120 is located between the push-pull mechanism 110 and the first electrical connector 130. The first electrical connector 130 can slide synchronously with the base 120, and technicians can push the base 120 and the first electrical connector 130 to slide toward the second electrical connector 150 in the sliding direction S1 through the push-pull mechanism 110, so that the first electrical connector 130 is plugged into the second electrical connector 150. As shown in FIG. 1A and FIG. 1B, the base 120 is detachably connected to the push-pull mechanism 110, so that the technicians can disassemble the base 120 and the first electrical connector 130 according to requirements.

Figure 1D:
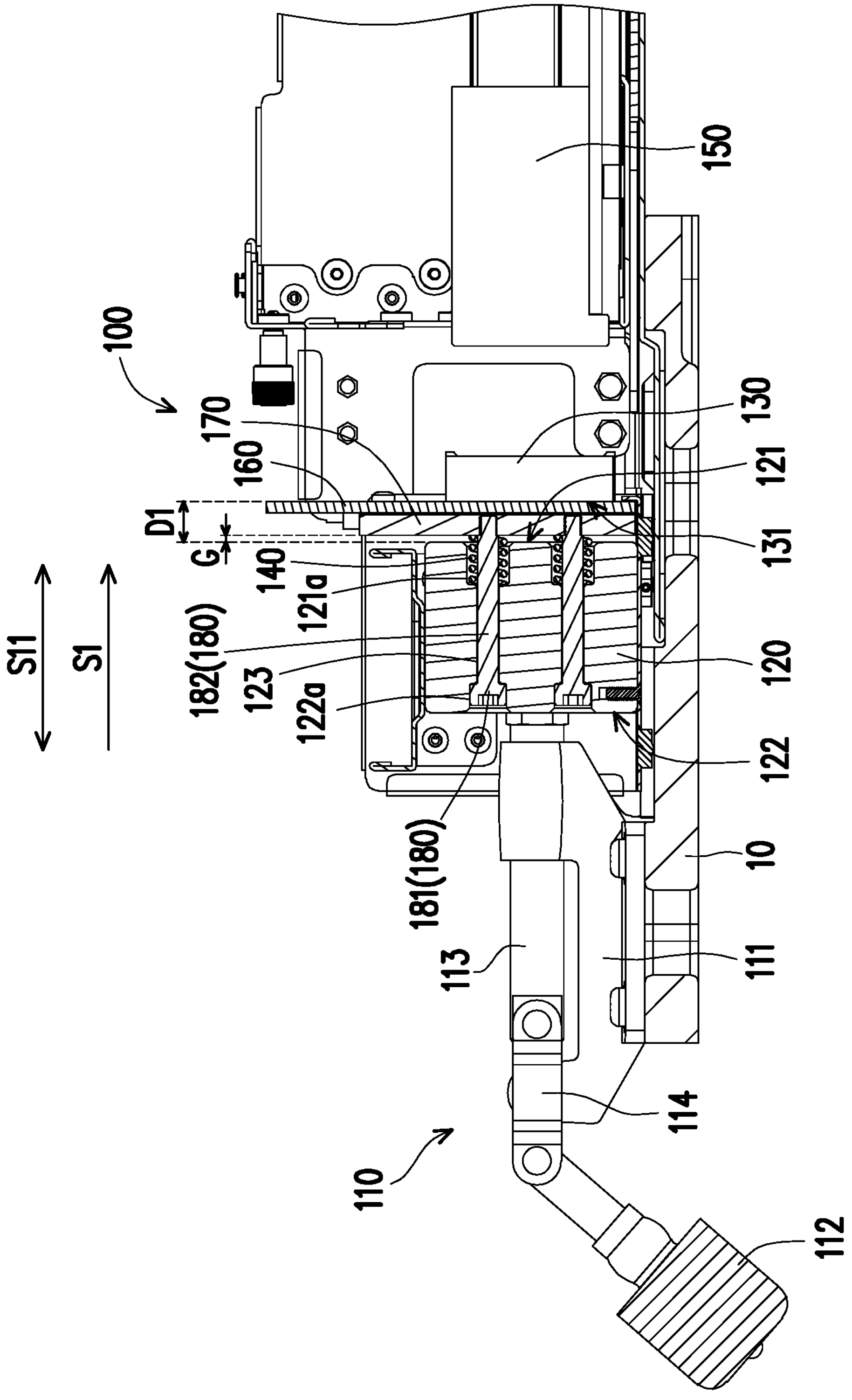
FIG. 1D is a schematic cross-sectional view of the electrical connector assembly in FIG. 1C along line I-I.
Figure 1E:
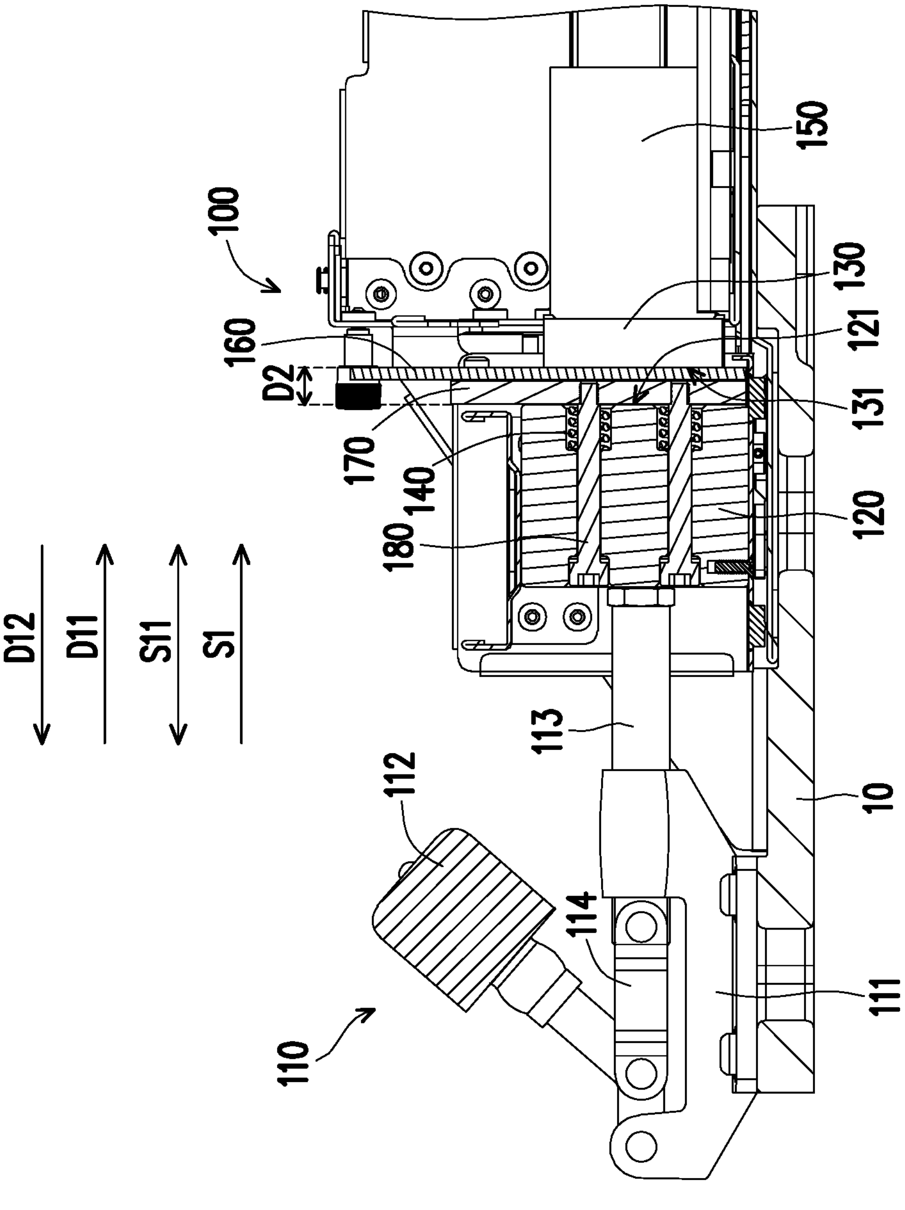
FIG. 1E is a schematic cross-sectional view of the electrical connector assembly in FIG. 1D switched to a docking state.

FIG. 1D is a schematic cross-sectional view of the electrical connector assembly in FIG. 1C along line I-I. FIG. 1E is a schematic cross-sectional view of the electrical connector assembly in FIG. 1D switched to a docking state. As shown in FIG. 1A, FIG. 1D and FIG. 1E, the first electrical connector 130 is connected to the base 120 and is configured to slide relatively to the base 120 in a floating direction S11 parallel to the sliding direction S1. On the other hand, the electrical connector assembly 100 further includes an elastic component 140, and the elastic component 140 is disposed between the base 120 and the first electrical connector 130. For example, the base 120, the first electrical connector 130 and the elastic component 140 can form a modular electrical connector structure. As shown in FIG. 1C, the base 120 is detachably connected to the push-pull mechanism 110, so that the technicians can disassemble and assemble the modular electrical connector structure according to requirements.

As shown in FIG. 1D and FIG. 1E, the modular electrical connector structure is slidably disposed between the push-pull mechanism 110 and the second electrical connector 150, and the second electrical connector 150 is disposed correspondingly to the first electrical connector 130. The technician can push the modular electrical connector structure to slide toward the second electrical connector 150 in the sliding direction S1 through the push-pull mechanism 110, so that the first electrical connector 130 can be accurately and quickly plugged into the second electrical connector 150, so the modular electrical connector structure has excellent assembling efficiency.

Specifically, the push-pull mechanism 110 pushes the base 120 to slide toward the second electrical connector 150 in the sliding direction S1, and the first electrical connector 130 and the elastic component 140 slide synchronously with the base 120, so that the first electrical connector 130 gradually approaches the second electrical connector 150, and contact the second electrical connector 150. When the first electrical connector 130 is plugged into the second electrical connector 150, the base 120 slides toward the first electrical connector 130 in the floating direction S11 and compresses the elastic component 140, and, at the same time, pushes the first electrical connector 130 to be plugged in position, for example, allowing the terminal of the first electrical connector 130 and the terminal of the second electrical connector 150 to have wipe lengths or contact areas that conform to specification (standard) values or recommended values.

As shown in FIG. 1D and FIG. 1E, the elastic component 140 can be a compression spring. During the process of plugging the first electrical connector 130 to position, the elastic component 140 can provide a buffer effect, so as to prevent the first electrical connector 130 and the second electrical connector 150 from bearing excessive pressure and causing damage, thereby improving assembling reliability. In addition, after the first electrical connector 130 is plugged in position, with the effect of elastic force of the elastic component 140, not only the first electrical connector 130 would not easily slip off from the second electrical connector 150, but also the terminal of the first electrical connector 130 and the terminal of the second electrical connector 150 have wipe lengths or contact areas that conform to specification values or recommended values. Thereby, the electrical connector assembly has excellent assembling reliability.

As shown in FIG. 1D and FIG. 1E, the first electrical connector 130 has a first surface 131 opposite to the second electrical connector 150, and the base 120 has a second surface 121 facing the first surface 131. As shown in FIG. 1D, before the first electrical connector 130 is plugged into the second electrical connector 150, there is a first distance D1 between the first surface 131 and the second surface 121. As shown in FIG. 1E, when the first electrical connector 130 is plugged in the second electrical connector 150, the base 120 slides toward the first electrical connector 130 in the floating direction S11 and compresses the elastic component 140, and, at the same time, pushes the first electrical connector 130 to be plugged in position. With the compression deformation of the elastic component 140, the distance between the first surface 131 of the first electrical connector 130 and the second surface 121 of the base 120 is reduced from the first distance D1 to the second distance D2, so as to avoid the first electrical connector 130 and the second electrical connector 150 bearing excessive pressure and being damaged due to pushing path of the first electrical connector 130 being overly long.

As shown in FIG. 1A, FIG. 1D and FIG. 1E, in this embodiment, the electrical connector assembly 100 further includes a circuit board 160, wherein the first electrical connector 130 is fixed on the circuit board 160, and the circuit board 160 is configured to slide relatively to the base 120 in the floating direction S11. In other words, the modular electrical connector structure can further include a circuit board 160. In detail, the circuit board 160 is located between the base 120 and the first electrical connector 130, and the elastic component 140 is located between the base 120 and the circuit board 160.

As shown in FIG. 1D and FIG. 1E, when the first electrical connector 130 is plugged into the second electrical connector 150, the base 120 slides toward the circuit board 160 in the floating direction S11 and compresses the elastic component 140, and simultaneously pushes the circuit board 160 and the first electrical connector 130, so that the first electrical connector 130 is plugged in position. During the process of plugging the first electrical connector 130 in position, the elastic component 140 can produce a buffer effect to prevent the circuit board 160 from bearing excessive pressure, which results in the circuit board 160 being broken, bent or deformed, thereby improving assembling reliability.

As shown in FIG. 1A, FIG. 1D and FIG. 1E, in this embodiment, the electrical connector assembly 100 further includes a reinforcing board 170, wherein the circuit board 160 is fixed on the reinforcing board 170, and the reinforcing board 170 is configured to slide relatively to the base 120 in the floating direction S11. In other words, the modular electrical connector structure can further include a reinforcing board 170. In detail, the reinforcing board 170 is located between the base 120 and the circuit board 160, wherein the elastic component 140 is arranged between the base 120 and the reinforcing board 170, and one of two opposite ends and the other one of two opposite ends of the elastic component 140 contact the base 120 and the reinforcing board 170 respectively. For example, the reinforcing board 170 can be a steel plate, other high-strength metal plates, other high-strength alloy plates or other high-strength material plates to withstand the thrust from the push-pull mechanism 110 and the base 120, so as to prevent the circuit board 160 from directly bearing the thrust and being broken, bent or deformed.

As shown in FIG. 1D, before the first electrical connector 130 is plugged into the second electrical connector 150, there is a gap G between the reinforcing board 170 and the second surface 121 of the base 120. As shown in FIG. 1E, when the first electrical connector 130 is plugged into the second electrical connector 150, the base 120 slides toward the reinforcing board 170 in the first direction D11 parallel to the floating direction S11, and the elastic component 140 is compressed by base 120 in the second Direction D12 opposite to the first direction D11. In addition, the reinforcing board 170, the circuit board 160 and the first electrical connector 130 are pushed simultaneously, so that the first electrical connector 130 is plugged in position. As the elastic component 140 compresses and deforms in the second direction D12, the base 120 slides toward the reinforcing board 170 in the first direction D11 until the second surface 121 of the base 120 is in contact with the reinforcing board 170, then the base 120 stops pushing the reinforcing board 170, the circuit board 160 and the first electrical connector 130, and the first electrical connector 130 is plugged in position. That is to say, the gap G reserved between the reinforcing board 170 and the second surface 121 of the base 120 improves the issue of the pushing path of the first electrical connector 130 being overly long.

As shown in FIG. 1D and FIG. 1E, in this embodiment, the electrical connector assembly 100 further includes a positioning rod 180, and the reinforcing board 170 is slidably connected to the base 120 through the positioning rod 180. In other words, the modular electrical connector structure can further include a positioning rod 180. In detail, the positioning rod 180 is slidably disposed on the base 120, wherein the elastic component 140 is sleeved on the positioning rod 180, and the positioning rod 180 is fixed on the reinforcing board 170. The positioning rod 180 penetrates through the base 120, and can slide relatively to the base 120 in the floating direction S11 within a set path. That is to say, the reinforcing board 170, the circuit board 160 and the first electrical connector 130 can slide relatively to the base 120 in the floating direction S11 within a set path through the positioning rod 180.

As shown in FIG. 1D, the base 120 also has a third surface 122 opposite to the second surface 121, a first opening 121*a* located on the second surface 121, a second opening 122*a* located on the third surface 122, and a through hole 123 connecting between the first opening 121*a* and the second opening 122*a*. The positioning rod 180 passes through the through hole 123 from the second opening 122*a*, and extends to the first opening 121*a*. In addition, the elastic component 140 is disposed in the first opening 121*a*. A part of the elastic component 140 protrudes from the second surface 121 or extends outward from the first opening 121*a* to contact the reinforcing board 170. The positioning rod 180 protrudes from the second surface 121 or extends outward from the first opening 121*a* to be connected to the reinforcing board 170.

As shown in FIG. 1D, the positioning rod 180 may include a positioning head portion 181 and the rod portion 182 that connects the positioning head portion 181. The positioning head portion 181 is slidably disposed in the second opening 122*a*, and the outer diameter of the positioning head portion 181 and the diameter of the second opening 122*a* are larger than the diameter of the through hole 123. In addition, the rod portion 182 passes through the through hole 123 and extends to the first opening 121*a*. The diameter of the first opening 121*a* is larger than the outer diameter of the rod portion 182 and the diameter of the through hole 123.

As shown in FIG. 1A, FIG. 1D and FIG. 1E, in this embodiment, the push-pull mechanism 110 includes a positioning base 111, a handle 112, a push-pull rod 113 and a linkage component 114. The positioning base 111 can be disposed on the casing of a server or other electronic equipment, and the handle 112 is pivotally connected to the positioning base 111. In addition, the push-pull rod 113 is slidably connected to the positioning base 111, wherein the base 120 is connected to the push-pull rod 113, and the handle 112 and the push-pull rod 113 are respectively pivotally connected to two opposite ends of the linkage component 114.

As shown in FIG. 1D and FIG. 1E, the linkage component 114 remains substantially horizontal before a technician rotates the handle 112 toward the base 120. When the technician rotates the handle 112 to the base 120, the end of the linkage component 114 that is pivotally connected to the handle 112 firstly raises and then falls, and pushed toward the base 120, such that the other end of the linkage component 114 that is pivotally connected to the push-pull rod

113 pushes the push-pull rod 113 to slide relatively to the positioning base 111 in the sliding direction S1, then the push-pull rod 113 pushes the base 120. When the end of the linkage component 114 that is pivotally connected to the handle 112 falls back to the positioning base 111, the linkage component 114 remains substantially horizontal and is locked to the positioning base 111. That is to say, when the push-pull rod 113 drives the base 120 forward in the sliding direction S1, the linkage component 114 shifts from the first position to the second position on the positioning base 111.

As shown in FIG. 1A and FIG. 1B, the push-pull rod 113 has a positioning portion 1131, such as a positioning protruding ring. The base 120 also has a positioning groove 124 and a bottom surface 125 connecting the third surface 122, the positioning groove 124 has two external openings, which are respectively located on the third surface 122 and the bottom surface 125, so as to facilitate fitting the positioning groove 124 onto the positioning portion 1131 or inserting the positioning portion 1131 into the positioning groove 124.

It is noted that the configurations for the elastic component 140 are merely examples and the elastic component 140 may include various elastic materials in different shapes to accommodate different scenarios. In one embodiment, the elastic component 140 can be an elastic piece or a leaf spring disposed between the base 120 and the circuit board 160. In the other embodiment, the elastic component 140 may be made of sponge, foam, rubber, plastic, fiber or the like. The elastic component 140 may be made of metal materials with flexibility, the elastic component 140 is deposed and surrounded the push-pull rod 113 (shown in FIG. 1F to FIG. 1G).

Figure 1F:
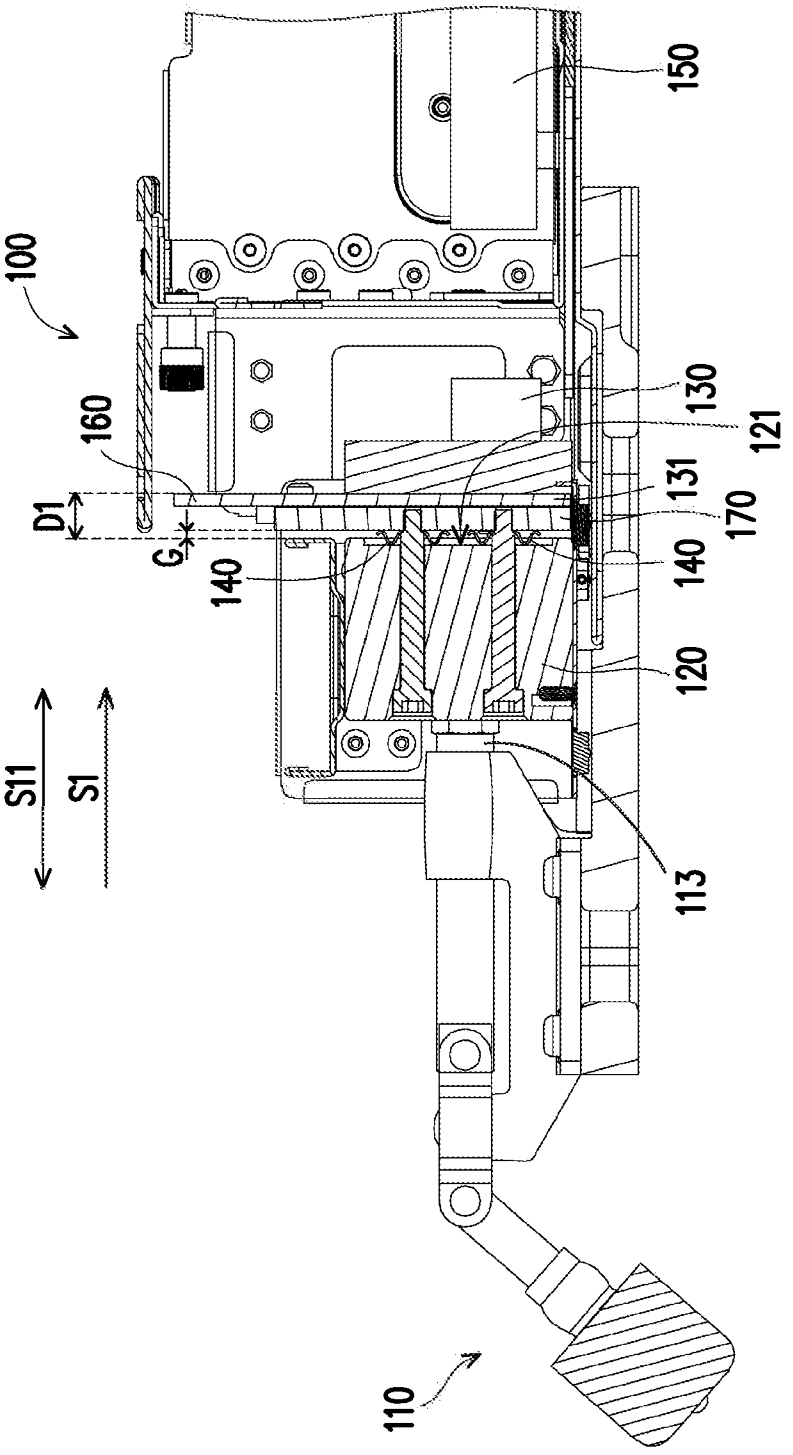
FIG. 1F is a schematic cross-sectional view of the electrical connector assembly of another embodiment of the present disclosure.
Figure 1G:
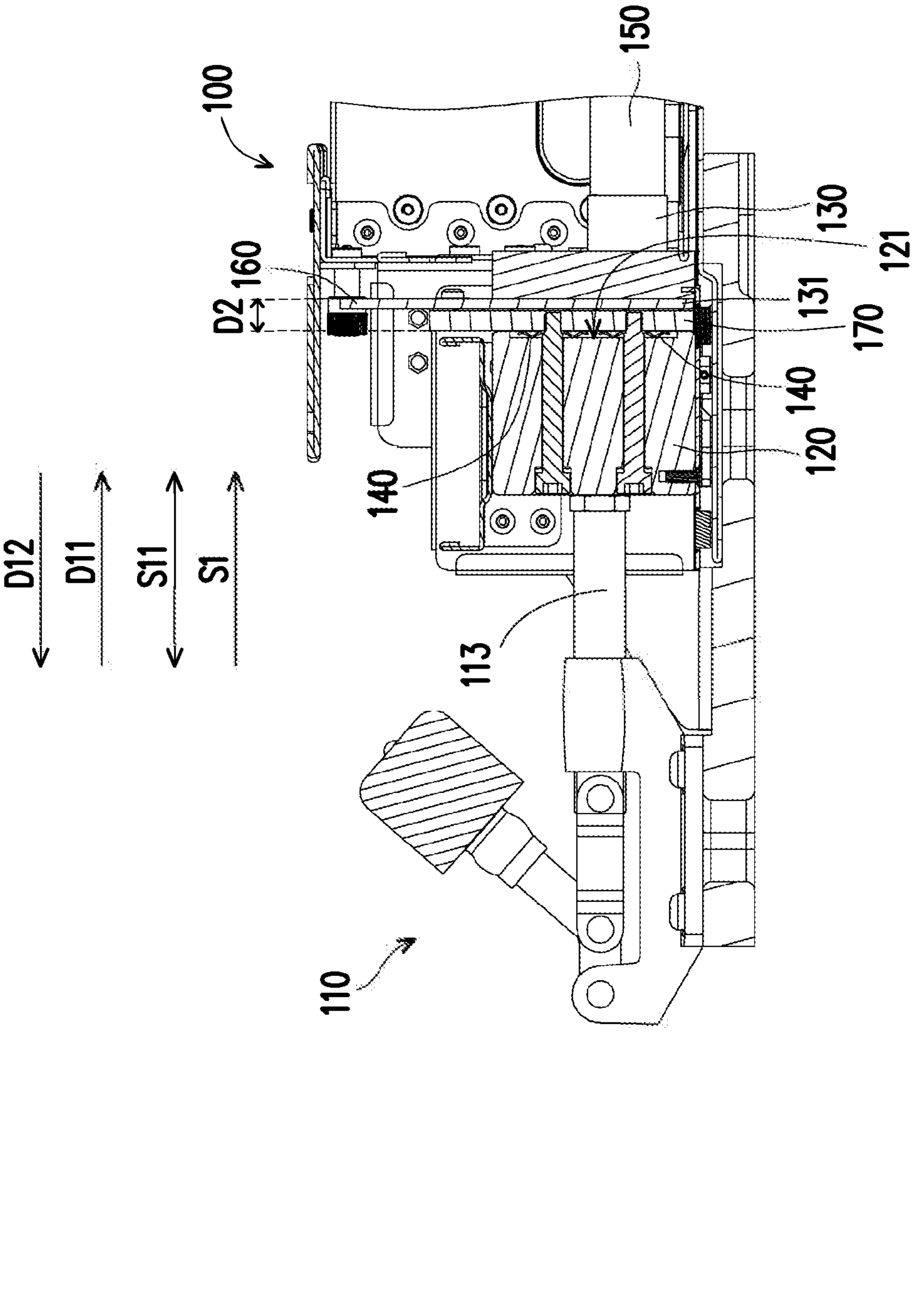
FIG. 1G is a schematic cross-sectional view of the electrical connector assembly in FIG. 1F switched to a docking state.

As shown in FIG. 1F and FIG. 1G, for example, the elastic component 140 is a leaf spring or elastic piece and between the base 120 and the first electrical connector 130 via the reinforcing board 170 and the circuit board 160. Before the first electrical connector 130 is plugged into the second electrical connector 150, the elastic component 140 is in an extended state which creates the first distance D1 between the first surface 131 and the second surface 121. When the first electrical connector 130 is plugged in the second electrical connector 150, the base 120 slides toward the first electrical connector 130 in the floating direction S11 and compresses the elastic component 140, and, at the same time, pushes the first electrical connector 130 to be plugged in position. With the compression deformation of the elastic component 140, the distance between the first surface 131 of the first electrical connector 130 and the second surface 121 of the base 120 is reduced from the first distance D1 to the second distance D2, so as to avoid the first electrical connector 130 and the second electrical connector 150 bearing excessive pressure and being damaged due to pushing path of the first electrical connector 130 being overly long.

Figure 2A:
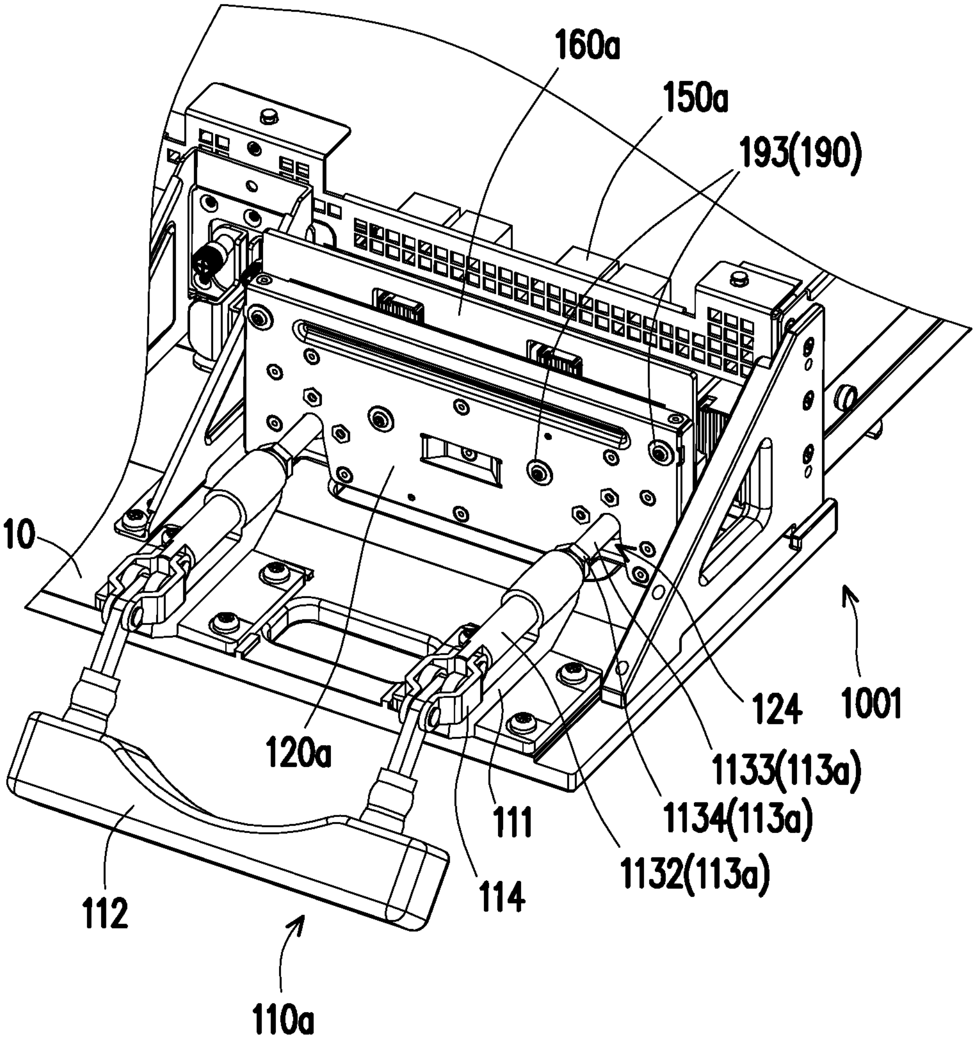
FIG. 2A is a schematic diagram of an electrical connector assembly of the second embodiment of the present disclosure.
Figure 2B:
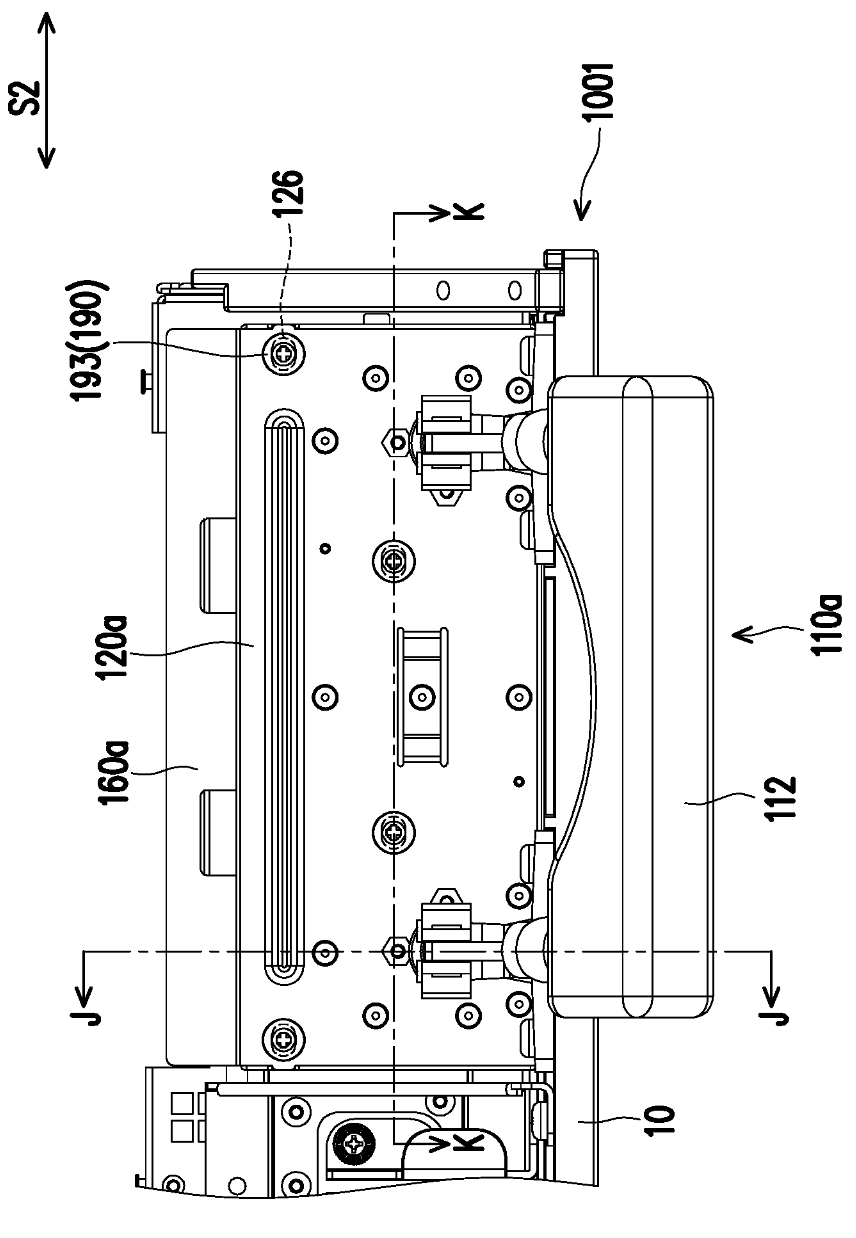
FIG. 2B is a schematic front view of the electrical connector assembly of FIG. 2A.

FIG. 2A is a schematic diagram of the electrical connector assembly of the second embodiment of the present disclosure. FIG. 2B is a schematic front view of the electrical connector assembly of FIG. 2A. Please refer to FIG. 2A and FIG. 2B, the electrical connector assembly 1001 of this embodiment is similar in structural design to the electrical connector assembly 100 of the first embodiment, and the main differences between the two embodiments will be described below.

Figure 2C:
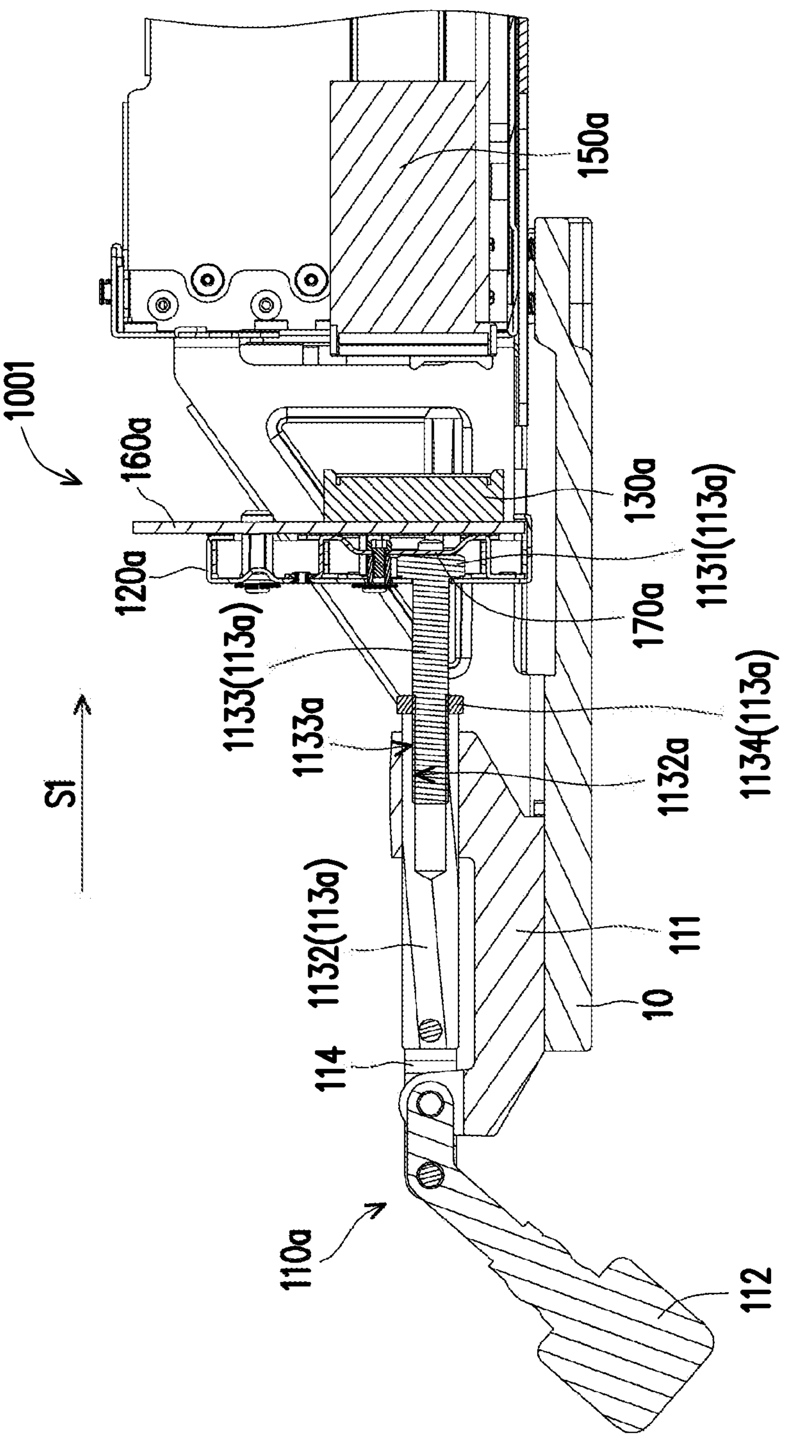
FIG. 2C is a schematic cross-sectional view of the electrical connector assembly in FIG. 2B along line J-J.
Figure 2D:
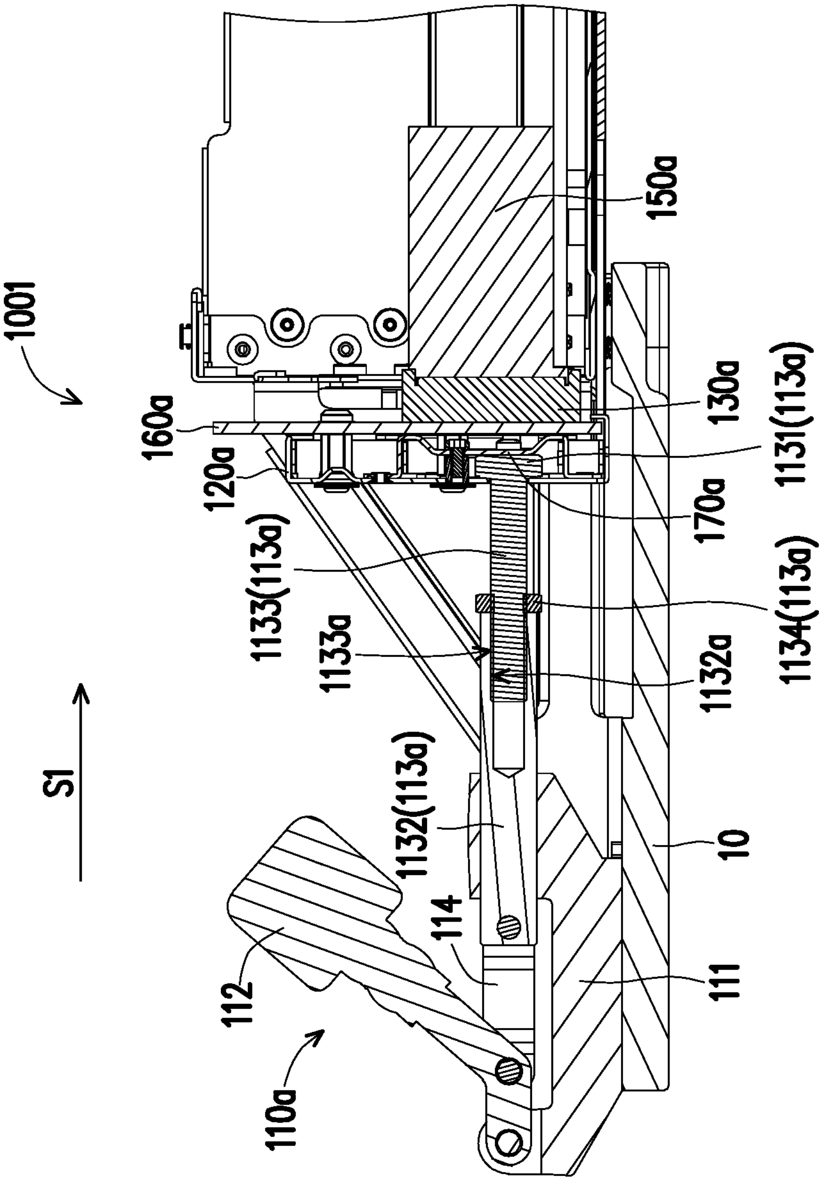
FIG. 2D is a schematic cross-sectional view of the electrical connector assembly in FIG. 2C switched to a docking state.

FIG. 2C is a schematic cross-sectional view of the electrical connector assembly in FIG. 2B along line J-J. FIG. 2D is a schematic cross-sectional view of the electrical connector assembly in FIG. 2C switching to a docking state. Please refer to FIG. 2C and FIG. 2D, in this embodiment, the push-pull mechanism 110*a* can simultaneously push the base 120*a*, the reinforcing board 170*a*, the circuit board 160*a* and the first electrical connector 130*a* to slide toward the second electrical connector 150*a* in the sliding direction S1, but the reinforcing board 170*a*, the circuit board 160*a* and the first electrical connector 130*a* do not have the freedom of movement to slide relatively to the base 120*a* in the floating direction S11 (see FIG. 1D and FIG. 1E).

In detail, the reinforcing board 170*a* is fixed to the base 120*a*, and is located between the circuit board 160*a* and the base 120*a*. Since the circuit board 160*a* contacts the base 120*a* and the reinforcing board 170*a*, the reinforcing board 170*a*, the circuit board 160*a* and the first electrical connector 130*a* do not have the freedom of movement to slide relative to the base 120*a* in the floating direction S11 (see FIG. 1D and FIG. 1E).

Figure 2E:
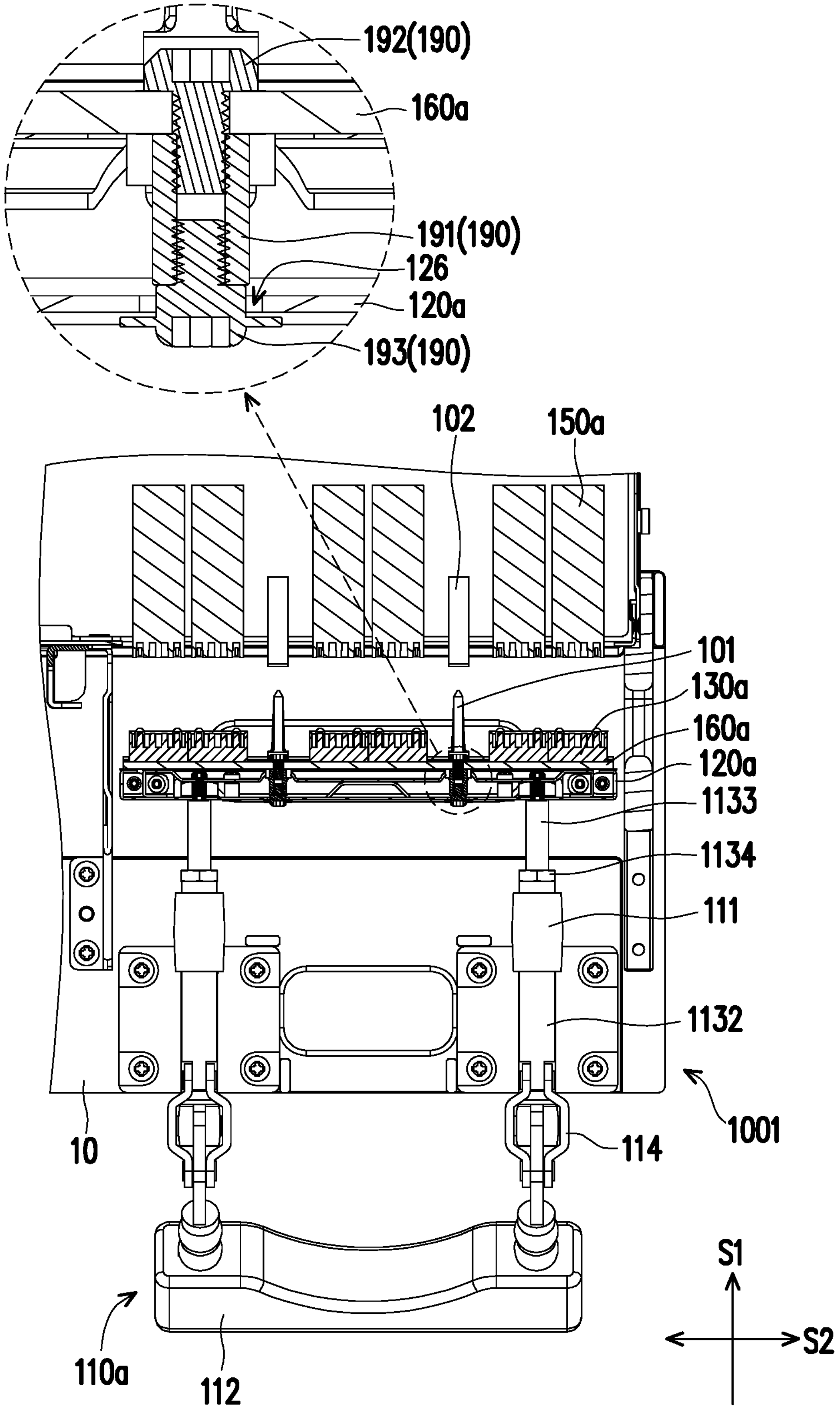
FIG. 2E is a schematic cross-sectional view of the electrical connector assembly in FIG. 2B along line K-K.
Figure 2F:
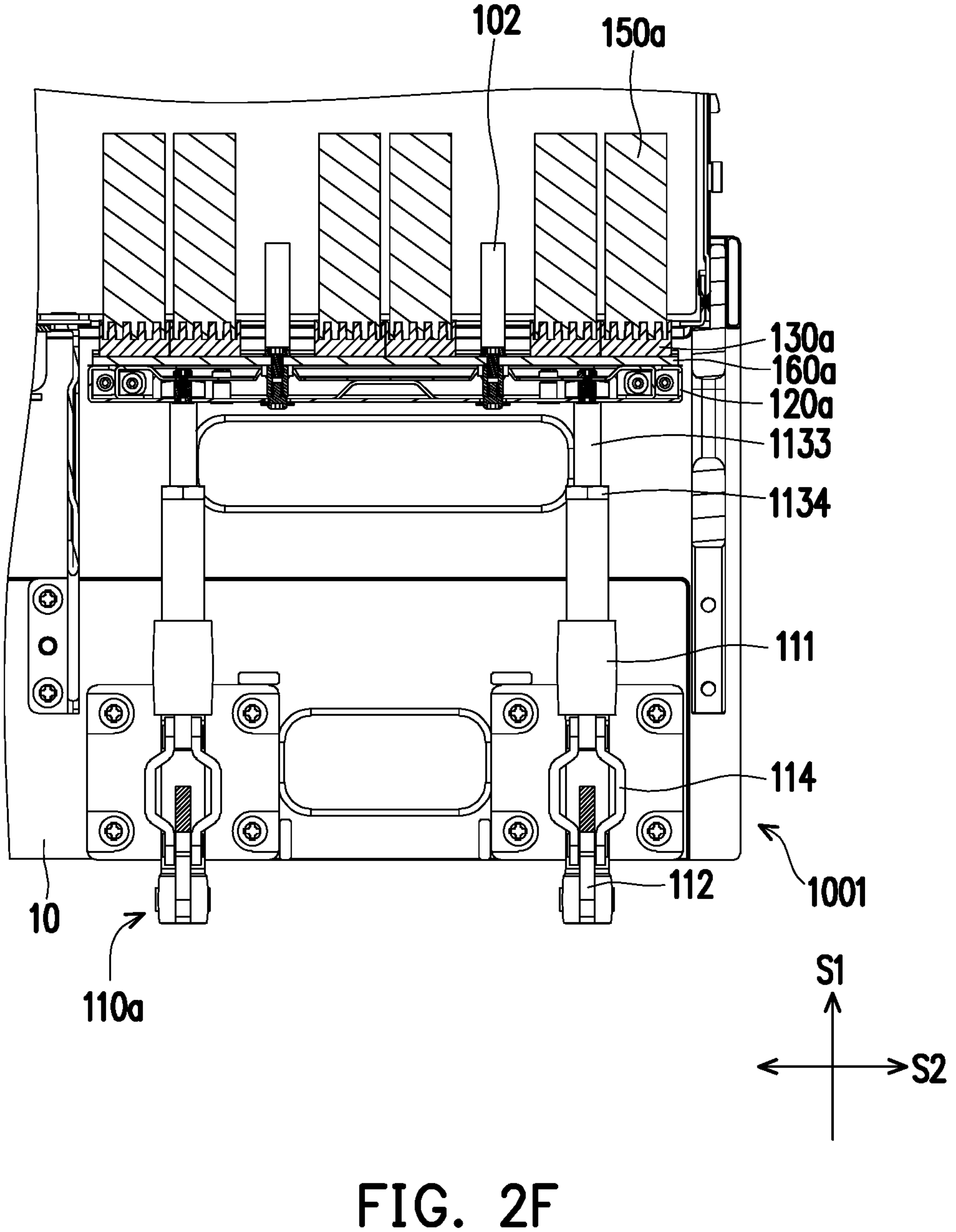
FIG. 2F is a schematic cross-sectional view of the electrical connector assembly in FIG. 2E switched to a docking state.

FIG. 2E is a schematic cross-sectional view of the electrical connector assembly in FIG. 2B along line K-K. FIG. 2F is a schematic cross-sectional view of the electrical connector assembly in FIG. 2E switching to a docking state. Please refer to FIG. 2B, FIG. 2E and FIG. 2F, in this embodiment, the circuit board 160*a* is connected to the base 120*a* and is configured for sliding relatively to the base 120*a* in the floating direction S2 perpendicular to the sliding direction S1. During the process of sliding the first electrical connector 130*a* in the sliding direction S1 to be plugged into the second electrical connector 150*a*, the first electrical connector 130*a* may not be accurately aligned with the second electrical connector 150*a* in the lateral direction. Since the first electrical connector 130*a* can slide relatively to the base 120*a* in the floating direction S2 along with the circuit board 160*a*, when the first electrical connector 130*a* is docked with the second electrical connector 150*a*, the first electrical connector 130*a* can generate moderate floating (for example, sliding in the floating direction S2 within a set path), so as to accurately align with the second electrical connector 150*a*, to prevent the first electrical connector 130*a* and the second electrical connector 150*a* from being damaged due to misalignment during docking.

As shown in FIG. 2B, FIG. 2E and FIG. 2F, the electrical connector assembly 1001 further includes a positioning component 190, and the base 120*a* has a slot 126, one end of the positioning component 190 passes through the slot 126, and the other end of the positioning component 190 is locked to the circuit board 160*a*. The positioning component 190 is configured to slide within the slot 126 in the floating direction S2. Based on the cooperation between the positioning component 190 and the slot 126, the first electrical connector 130*a* and the circuit board 160*a* can slide relatively to the base 120*a* within a set path in the floating direction S2.

As shown in FIG. 2E, in detail, the positioning component 190 can be composed of a positioning sleeve 191 and two positioning screws 192, 193, and the positioning sleeve 191 is located between the base 120*a* and the circuit board 160*a*. The positioning screw 192 is locked to the circuit board 160*a*, and locked into the positioning sleeve 191. In addition, the positioning screw 193 is slidably connected to the base 120*a* and locked into the positioning sleeve 191.

As shown in FIG. 2A, FIG. 2C and FIG. 2D, the positioning portion 1131 of the push-pull rod 113*a* is inserted into the positioning groove 124 of the base 120*a*, and contacts the reinforcing board 170*a*. The length of the push-pull rod 113*a* can be adjusted to increase or reduce the pushing path of the first electrical connector 130, so as to avoid issues such as excessive or insufficient pushing path of the first electrical connector 130.

As shown in FIG. 2C, in this embodiment, the push-pull rod 113*a* includes a sliding rod 1132 and a telescopic rod 1133, wherein the sliding rod 1132 is slidably connected to the positioning base 111 and pivotally connected to the linkage component 114. The telescopic rod 1133 is connected to the sliding rod 1132, wherein the positioning portion 1131 is located at the end of the telescopic rod 1133, and the base 120*a* is connected to the telescopic rod 1133. Specifically, the telescopic rod 1133 can be a screw with an outer thread 1133*a*, and the sliding rod 1132 can be a sliding sleeve with an inner thread 1132*a*. The outer thread 1133*a* of the telescopic rod 1133 is engaged with the inner thread 1132*a* of the sliding rod 1132 to adjust the protruding length of the telescopic rod 1133 relative to the sliding rod 1132.

As shown in FIG. 2D, on the other hand, the push-pull rod 113*a* further includes a positioning nut 1134 that is sleeved on the telescopic rod 1133 and is engaged with the outer thread 1133*a* of the telescopic rod 1133. The positioning nut 1134 is locked at one end of the sliding rod 1132 and contacts the sliding rod 1132 to lock the protruding length of the telescopic rod 1133 relative to the sliding rod 1132.

As shown in FIG. 2E and FIG. 2F, in this embodiment, the electrical connector assembly 1001 further includes a first guiding component 101 and a second guiding component 102, wherein the first guiding component 101 can be a guiding post protruding from the circuit board 160*a*, and the first electrical connector 130*a* and the first guiding component 101 are located on the same side of the circuit board 160*a*. The second guiding component 102 is disposed correspondingly to the first guiding component 101, and may have a guiding slot matched with the guiding post. The second guiding component 102 can be disposed on the casing of the server or other electronic equipment, and is located at one side of the second electrical connector 150*a*.

In detail, the push-pull mechanism 110*a* can push the base 120*a* to slide in the sliding direction S1 to the second electrical connector 150*a*, and the circuit board 160*a*, the first electrical connector 130*a* and the first guiding component 101 slide synchronously with the base 120*a*. Before the first electrical connector 130*a* is docked with the second electrical connector 150*a*, the first guiding component 101 is inserted into the second guiding component 102 and drives the circuit board 160*a* to slide in the floating direction S2, so that the first electrical connector 130*a* that slides synchronously with the circuit board 160*a* is accurately aligned with the second electrical connector 150*a*, to prevent the first electrical connector 130*a* and the second electrical connector 150*a* from being damaged due to misalignment during docking.

Figure 3A:
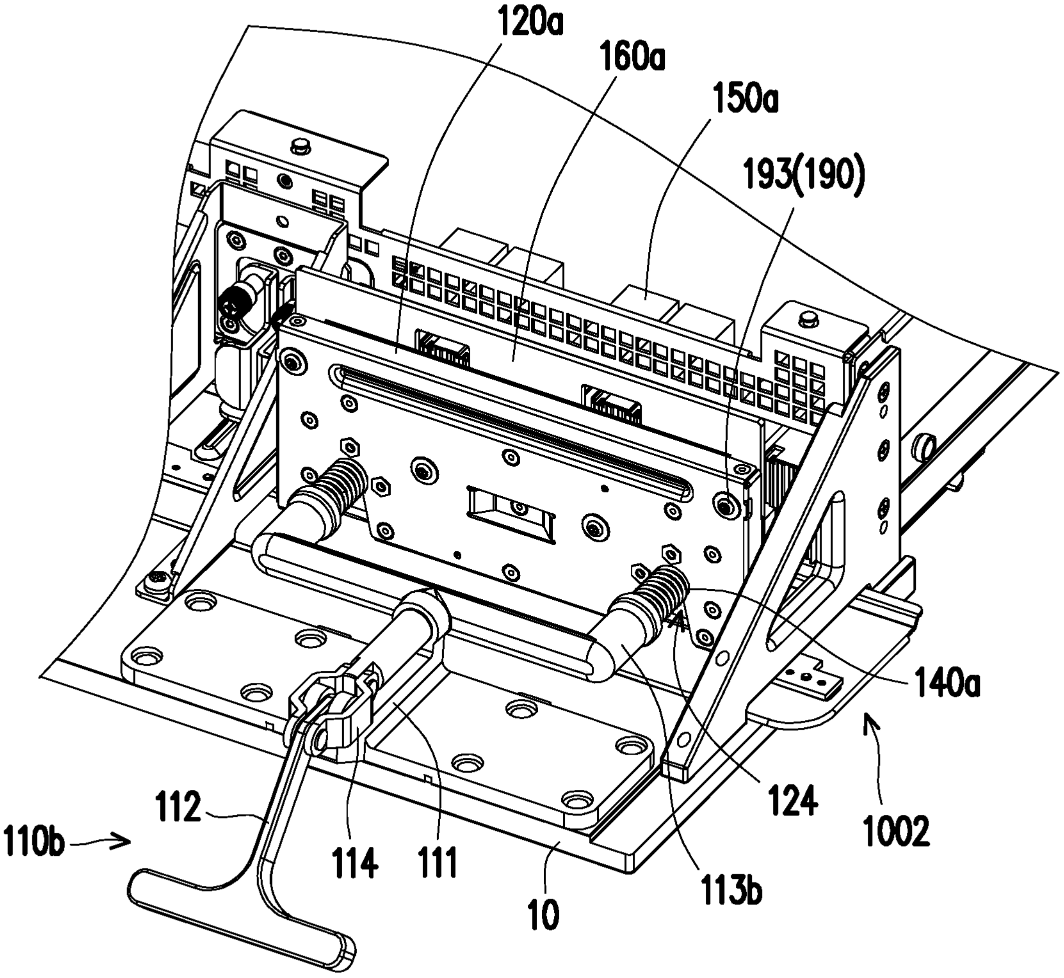
FIG. 3A is a schematic diagram of an electrical connector assembly of the third embodiment of the present disclosure.
Figure 3B:
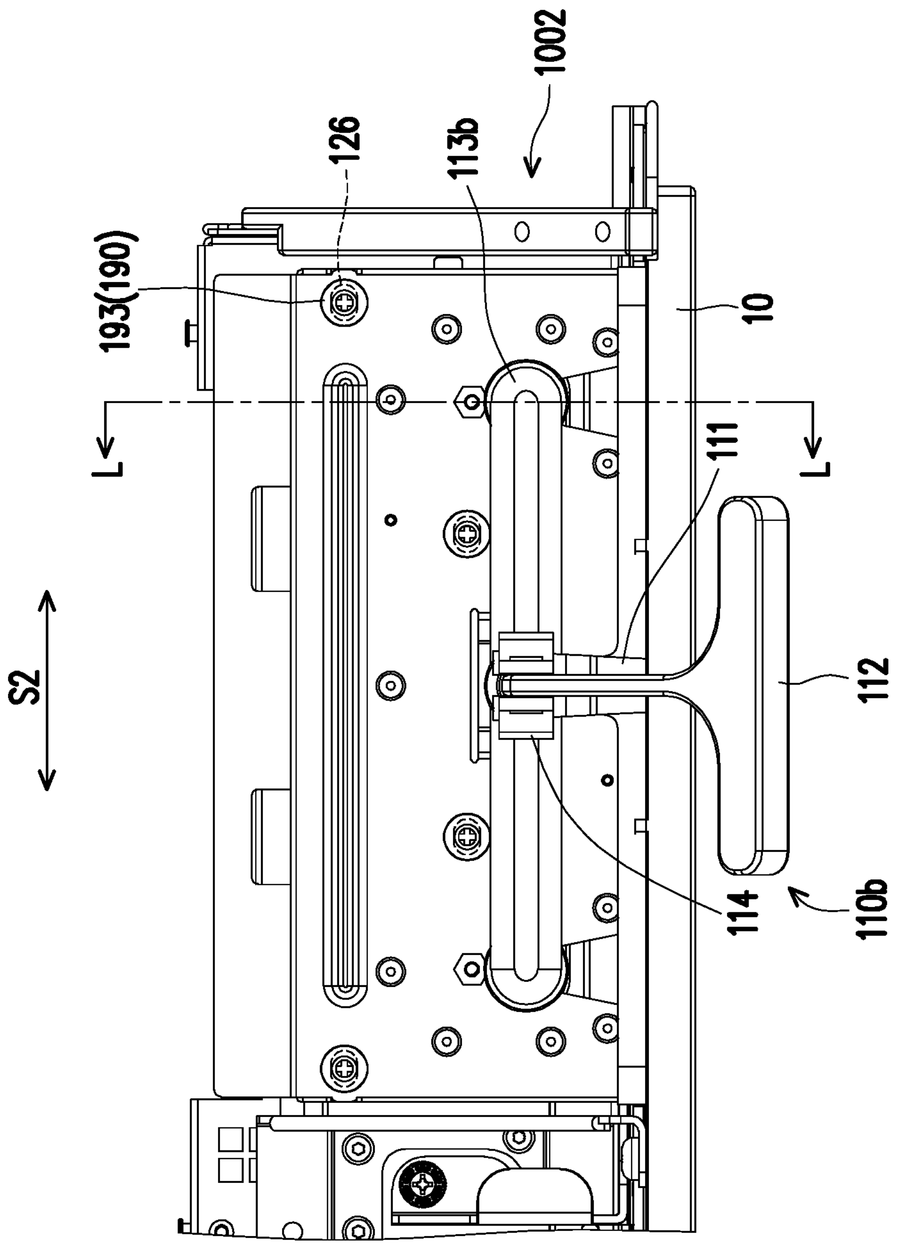
FIG. 3B is a schematic front view of the electrical connector assembly in FIG. 3A.

FIG. 3A is a schematic diagram of the electrical connector assembly of the third embodiment of the present disclosure. FIG. 3B is a schematic front view of the electrical connector assembly in FIG. 3A. Please refer to FIG. 3A and FIG. 3B, the structural design of the electrical connector assembly 1002 of this embodiment is similar to that of the electrical connector assembly 1001 of the second embodiment, and the main differences between the two embodiments will be described below.

Figure 3C:
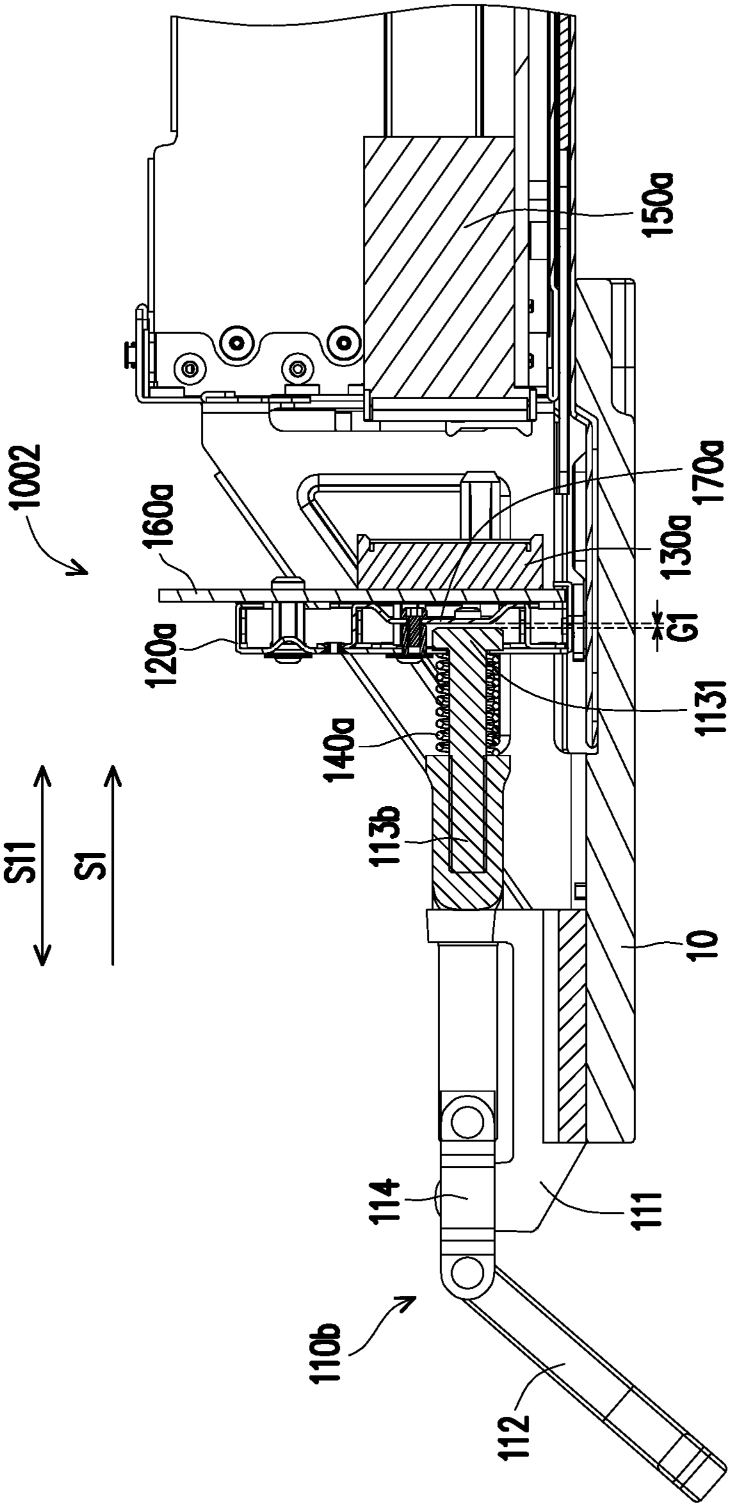
FIG. 3C is a schematic cross-sectional view of the electrical connector assembly in FIG. 3B along line L-L.
Figure 3D:
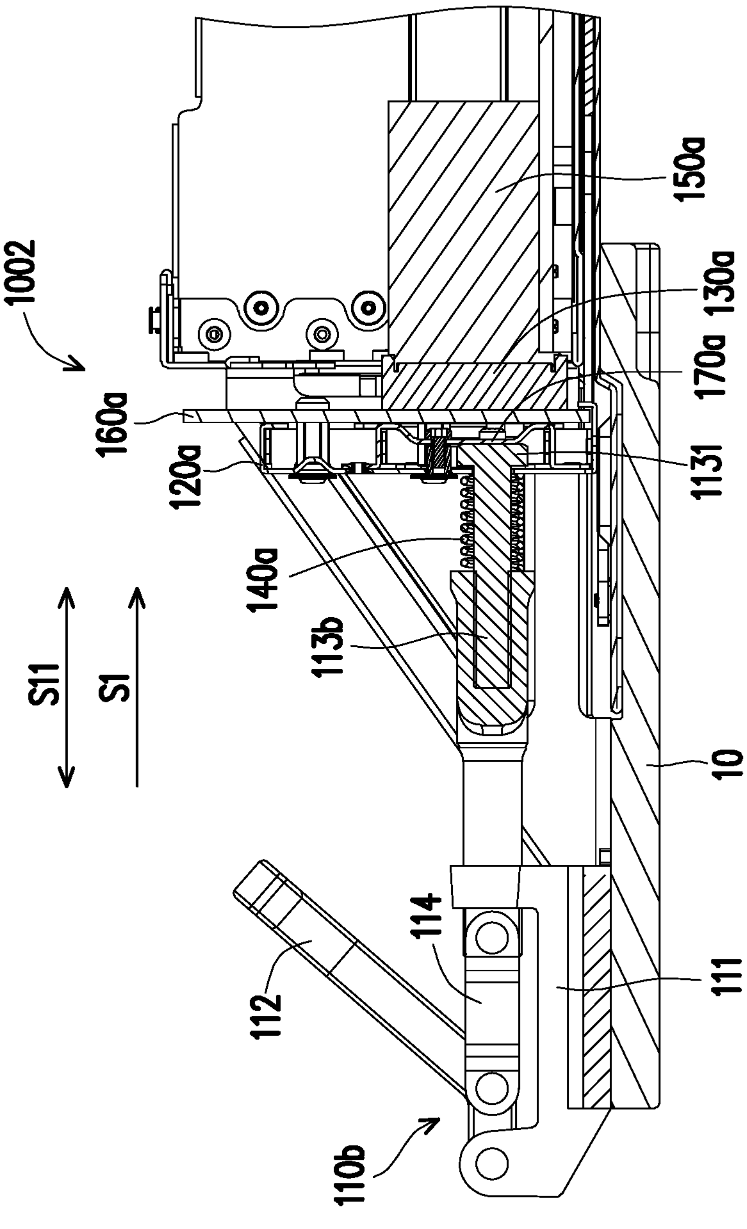
FIG. 3D is a schematic cross-sectional view of the electrical connector assembly in FIG. 3C switched to a docking state.

FIG. 3C is a schematic cross-sectional view of the electrical connector assembly in FIG. 3B along line L-L. FIG. 3D is a schematic cross-sectional view of the electrical connector assembly in FIG. 3C switching to a docking state. Please refer to FIG. 3B to FIG. 3D, in this embodiment, the circuit board 160*a* and the first electrical connector 130*a* are configured for being relative to base 120*a* in the floating direction S2, and push-pull rod 113*b* has freedom of movement for sliding relatively to base 120*a* in the floating direction S11. That is, the push-pull rod 113*b* is slidably connected to the base 120*a*.

In detail, the electrical connector assembly 1002 may include an elastic component 140*a*, wherein the elastic component 140*a* may be a compression spring, and is sleeved on the push-pull rod 113*b*. The length of the push-pull rod 113*b* is not adjustable, and one of two opposite ends and the other one of two opposite ends of the elastic component 140*a* contact the push-pull rod 113*b* and the base 120*a* respectively. The positioning portion 1131 of the push-pull rod 113*b* is inserted into the base 120*a*, and there is a gap G1 between the positioning portion 1131 and the reinforcing board 170*a* before the first electrical connector 130*a* is plugged into the second electrical connector 150*a*.

As shown in FIG. 3C and FIG. 3D, when the first electrical connector 130*a* is plugged into the second electrical connector 150*a*, the push-pull rod 113*b* slides toward the reinforcing board 170*a* in the sliding direction S1, compresses the elastic component 140*a*, and simultaneously pushes the base 120*a*, the reinforcing board 170*a*, the circuit board 160*a* and the first electrical connector 130*a* to plug the first electrical connector 130*a* in position. With the compression deformation of the elastic component 140*a*, the push-pull rod 113*b* slides relative to the base 120*a* in the floating direction S11, and slides toward the reinforcing board 170*a* until the positioning portion 1131 contacts the reinforcing board 170*a*, then the push-pull rod 113*b* stops pushing the base 120*a*, the reinforcing board 170*a*, the circuit board 160*a* and the first electrical connector 130*a*, and the first electrical connector 130*a* is plugged in position. That is to say, the gap G1 reserved between the push-pull rod 113*b* and the reinforcing board 170*a* can improve the issues of the pushing path of the first electrical connector 130*a* being overly long.

On the other hand, during the process of plugging the first electrical connector 130*a* into position, the elastic component 140*a* can produce a buffer effect, so as to prevent the first electrical connector 130*a* and the second electrical connector 150*a* from being damaged due to bearing excessive pressure, thereby improving assembling reliability. After the first electrical connector 130*a* is plugged in position, with the elastic force of the elastic component 140*a*, not only the first electrical connector 130*a* would not easily slip off from the second electrical connector 150*a*, but it can also ensure that the terminals of the first electrical connector 130*a* and the terminals of the second electrical connector 150*a* have wiping lengths or contact areas conform to the specification value or recommended value, so that the electrical connector assembly 1002 has excellent assembling reliability.

To sum up, in the electrical connector assembly of the present disclosure, the technician may push the first electrical connector to slide toward the second electrical connector through the push-pull mechanism, so that the first electrical connector can be accurately and quickly plugged into the second electrical connector, so that the electrical connector assembly has excellent assembling efficiency. In one embodiment, the electrical connector assembly has a buffer design, for example, in the process of plugging the first electrical connector into the second electrical connector, the elastic component produces a buffer effect, so as to prevent the first electrical connector and the second electrical connector from being damaged due to bearing excessive pressure, thereby improving assembling reliability. In another embodiment, the electrical connector assembly has a floating alignment design. For example, the first electrical connector can generate moderate floating in the process of docking with the second electrical connector to accurately align with the second electrical connector, so as to prevent the first electrical connector and the second electrical connector from collision and being damaged due to misalignment, thereby improving assembling reliability and assembling efficiency.

Although the present disclosure has been disclosed above with the embodiments, it is not intended to limit the present disclosure. Anyone with ordinary knowledge in the technical field may make some changes and modifications without departing from the spirit and scope of the present disclosure. The scope of protection of the present disclosure should be defined by the scope of the appended patent application.

What is claimed is:

1. An electrical connector assembly, comprising:

a push-pull mechanism comprising:

a positioning base;

a handle pivotally connected to the positioning base;

a push-pull rod slidably connected to the positioning base; and a linkage component, wherein the handle and the push-pull rod are pivotally connected to one of two opposite ends and the other of two opposite ends of the linkage component respectively;

a base detachably connected to the push-pull mechanism; and a first electrical connector connected to the base and slid relatively to the base in a floating direction;

wherein the base is configured to slide toward a second electrical connector disposed corresponding to the first electrical connector in a sliding direction via the push-pull mechanism in two-stage, and the first electrical connector is slid synchronously with the base and plugged into the second electrical connector, and when the base is driven by the push-pull rod forward in the sliding direction, the linkage component is shifted from the first position to the second position on the positioning base.

2. The electrical connector assembly as claimed in claim 1, further comprising:

a circuit board located between the base and the first electrical connector fixed onto the circuit board, wherein the circuit board is configured to slide relatively to the base in the floating direction, and the floating direction is parallel to the sliding direction or perpendicular to the sliding direction.

3. The electrical connector assembly as claimed in claim 2, further comprising:

a reinforcing board attached to the circuit board and being between the base and the circuit board, wherein the reinforcing board is configured to slide in the floating direction relatively to the base, and the floating direction is parallel to the sliding direction.

4. The electrical connector assembly as claimed in claim 3, further comprising:

an elastic component having a first end in contact with the base and a second end opposite to the first end in contact with the reinforcing board.

5. The electrical connector assembly as claimed in claim 4, wherein the reinforcing board and the base defining a gap therebetween, and responsive to the first electrical connector being plugged into the second electrical connector, the base is configured to slide toward the reinforcing board in a first direction and shorten the gap and the elastic component is compressed by the base in a second direction, and the first direction is opposite to the second direction; and the electrical connector assembly further comprising a positioning rod slidably disposed on the base, wherein the elastic component is sleeved onto the positioning rod, and the positioning rod is fixed to the reinforcing board.

6. The electrical connector assembly as claimed in claim 4, wherein the reinforcing board and the base defining a gap therebetween, and responsive to the first electrical connector being plugged into the second electrical connector, the base is configured to slide toward the reinforcing board in a first direction and shorten the gap and the elastic component is compressed by the base in a second direction, and the first direction is opposite to the second direction; and a positioning rod slidably disposed on the base, wherein the elastic component is disposed and surrounded the positioning rod, and the positioning rod is fixed to the reinforcing board.

7. The electrical connector assembly as claimed in claim 2, further comprising:

a reinforcing board fixed to the base and connected to the circuit board, wherein the floating direction is perpendicular to the sliding direction.

8. The electrical connector assembly as claimed in claim 2, further comprising:

a first guiding component protruding from the circuit board; and a second guiding component corresponding to the first guiding component and being on a side of the second electrical connector, wherein the first electrical connector and the first guiding component are on the same side of the circuit board, the floating direction is perpendicular to the sliding direction, the base is configured to slide towards the second electrical connector in the sliding direction via the push-pull mechanism, the circuit board, the first electrical connector, and the first guiding component are slid synchronously with the base with the first guiding component engaging the second guiding component, the circuit board is configured to slide in the floating direction, and the first electrical connector is slid synchronously with the circuit board and align with the second electrical connector.

9. The electrical connector assembly as claimed in claim 2, further comprising:

a positioning component, wherein the floating direction is perpendicular to the sliding direction, the base includes a slot, the positioning component having a first end configured to pass through the slot and a second end locked to the circuit board, and the positioning component is slid in the slot in the floating direction.

10. The electrical connector assembly as claimed in claim 1, wherein the push-pull rod includes a positioning protruding ring.

11. An electrical connector assembly, comprising:

a housing;

a push-pull mechanism disposed on the housing comprising:

a positioning base;

a handle pivotally connected to the positioning base;

a push-pull rod slidably connected to the positioning base; and a linkage component, wherein the handle and the push-pull rod are pivotally connected to one of two opposite ends and the other of two opposite ends of the linkage component respectively;

a base detachably connected to the push-pull mechanism;

a first electrical connector connected to the base and slid relatively to the base in a floating direction; and a second electrical connector disposed on the housing and corresponding to the first electrical connector, wherein the base is configured to slide toward the second electrical connector in a sliding direction via the push-pull mechanism in two-stage, urging the first electrical connector to slide synchronously with the base and plug into the second electrical connector, and when the base is driven by the push-pull rod forward in the sliding direction, the linkage component is shifted from the first position to the second position on the positioning base.

12. The electrical connector assembly as claimed in claim 11, further comprising:

a circuit board located between the base and the first electrical connector and fixed to the first electrical connector, the circuit board configured to slide relatively to the base in the floating direction, and wherein the floating direction is parallel to the sliding direction or perpendicular to the sliding direction.

13. The electrical connector assembly as claimed in claim 12, further comprising:

a reinforcing board located between the base and the circuit board and fixed to circuit board, the circuit board configured to slide is relatively to the base in the floating direction, and wherein the floating direction is parallel to the sliding direction.

14. The electrical connector assembly as claimed in claim 13, further comprising:

an elastic component having a first end in contact with the base and a second end in contact with the reinforcing board.

15. The electrical connector assembly as claimed in claim 14, wherein the reinforcing board and the base defining a gap therebetween, and responsive to the first electrical connector being plugged into the second electrical connector, the base is configured to slide toward the reinforcing board in a first direction and connect to the reinforcing board and the elastic component is compressed by the base in a second direction, and the first direction is opposite to the second direction; and the electrical connector assembly further comprises a positioning rod slidably disposed on the base, wherein the elastic component is sleeved onto the positioning rod, and the positioning rod is fixed to the reinforcing board.

16. The electrical connector assembly as claimed in claim 14, wherein the reinforcing board and the base defining a gap therebetween, and responsive to the first electrical connector being plugged into the second electrical connector, the base is configured to slide toward the reinforcing board in a first direction and connect to the reinforcing board and the elastic component is compressed by the base in a second direction, and the first direction is opposite to the second direction; and the electrical connector assembly further comprises a positioning rod slidably disposed on the base, wherein the elastic component is disposed and surrounded the positioning rod, and the positioning rod is fixed to the reinforcing board.

17. The electrical connector assembly as claimed in claim 12, further comprises:

a reinforcing board fixed to the base and connected to the circuit board, wherein the floating direction is perpendicular to the sliding direction.

18. The electrical connector assembly as claimed in claim 12, further comprises:

a first guiding component protruding from the circuit board, wherein the first electrical connector and the first guiding component are on the same side of the circuit board; and a second guiding component corresponding to the first guiding component, wherein the second guiding component is on a side of the second electrical connector, wherein the base is configured to slide towards the second electrical connector in the sliding direction via the push-pull mechanism, the circuit board, the first electrical connector, and the first guiding component are slid synchronously with the base with the first guiding component being inserted into the second guiding component, the circuit board is configured to slide in the floating direction via the second guiding component, the floating direction is perpendicular to the sliding direction, and the first electrical connector is slid synchronously with the circuit board and align with the second electrical connector.

19. The electrical connector assembly as claimed in claim 12, further comprises:

a positioning component, wherein the base includes a slot, the positioning component having a first end passing through the slot and a second end locked to the circuit board, the floating direction is perpendicular to the sliding direction, and the positioning component is slid in the slot in the floating direction.

20. The electrical connector assembly as claimed in claim 11, wherein the push-pull rod includes a positioning protruding ring.

* * * * *